(12) United States Patent
Chu

(10) Patent No.: US 7,731,410 B2
(45) Date of Patent: Jun. 8, 2010

(54) LIGHT-EMITTING MODULE, METHOD OF MANUFACTURING THE SAME AND DISPLAY DEVICE HAVING THE SAME

(75) Inventor: Young-Bee Chu, Suwon-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 734 days.

(21) Appl. No.: 11/511,681

(22) Filed: Aug. 29, 2006

(65) Prior Publication Data

US 2007/0154199 A1   Jul. 5, 2007

(30) Foreign Application Priority Data

Dec. 29, 2005 (KR) .................. 10-2005-0133150

(51) Int. Cl.
*F21V 7/04* (2006.01)
*F21V 9/16* (2006.01)

(52) U.S. Cl. .................. 362/614; 362/608; 362/84; 362/617

(58) Field of Classification Search ......... 362/600–634, 362/26, 27, 84; 349/69, 70, 71
See application file for complete search history.

(56) References Cited

U.S. PATENT DOCUMENTS

| | | | | |
|---|---|---|---|---|
| 6,871,972 B2 * | 3/2005 | Ju | ................................ | 362/26 |
| 7,455,441 B2 * | 11/2008 | Chose et al. | ................ | 362/608 |
| 2004/0223315 A1 * | 11/2004 | Suehiro et al. | ................ | 362/84 |

FOREIGN PATENT DOCUMENTS

JP   2004-235139   8/2004

* cited by examiner

*Primary Examiner*—Bao Q Truong
(74) *Attorney, Agent, or Firm*—F. Chau & Associates, LLC

(57) ABSTRACT

A light-emitting module includes a light guiding body, a light-emitting unit and a fluorescent unit. The light-guiding unit has a groove. The light-emitting unit is disposed in a portion of the groove and emits a first light. The fluorescent unit is disposed in a remaining portion of the groove, receives the first light and emits a second light having a different wavelength range than the first light. The fluorescent unit emits the second light to an inner side surface of the groove. Therefore, loss of the first and second light is reduced and light-using efficiency of the light-emitting module is increased. Furthermore, a power consumption of a display device is significantly reduced.

15 Claims, 14 Drawing Sheets

US 7,731,410 B2

LIGHT-EMITTING MODULE, METHOD OF MANUFACTURING THE SAME AND DISPLAY DEVICE HAVING THE SAME

CROSS-REFERENCE TO RELATED APPLICATION

This application claims priority to Korean Patent Application No. 2005-133150 filed on Dec. 29, 2005, the contents of which are herein incorporated by reference in their entirety.

BACKGROUND OF THE INVENTION

1. Technical Field

The present disclosure relates to a light-emitting module, and, more particularly, to a light-emitting module capable of reducing loss of light emitted from a light-emitting unit of the light-emitting module and increasing light-using efficiency of the light-emitting module, a method of manufacturing the light-emitting module and a display device having the light-emitting module.

2. Discussion of the Related Art

A liquid crystal display apparatus may be applied to, for example, a personal computer, a notebook computer, a navigator for an automobile, and a television set to display an image from data converted to an electrical format. Since the liquid crystal display apparatus is, for example, light weight, and occupies a small volume, the liquid crystal display apparatus is widely used in various industrial fields.

The liquid crystal display apparatus may include a light-emitting module to display an image when natural light is lacking. Research to reduce volume, thickness and weight of the liquid crystal display apparatus, and to increase display quality and light-using efficiency to reduce power consumption of a display apparatus has been performed.

The light-emitting module can occupy a majority of the volume, thickness and weight of a display apparatus. Thus, it is desirable to reduce volume, thickness and weight of the light-emitting module, and to improve power consumption and brightness thereof.

A small or medium-sized liquid crystal display apparatus employed by a mobile device, such as a cellular phone and a personal digital assistant, may include a light-emitting diode having a small volume and a light weight, and consuming low power.

Brightness of a light-emitting module and a liquid crystal display apparatus has been improved by a light-emitting diode emitting high luminance light. However, the light-using efficiency of the light-emitting diode is low. Thus, power consumption of the light-emitting module and the liquid crystal display apparatus is high.

A structure of a conventional mobile liquid crystal display apparatus is a contributing factor to low light-using efficiency. Particularly, a conventional mobile liquid crystal display apparatus includes a light-guiding unit, which guides light generated by the light-emitting diode toward a display panel. The light-emitting diode is disposed adjacent to a side surface of the light-guiding unit. The light generated by the light-emitting diode enters the light-guiding unit, but a portion of the light is reflected by the side surface of the light guide plate and is leaked. As a gap between the light-guiding unit and the light-emitting diode increases, light leakage increases.

As a result, a light-emitting portion of the light-emitting diode is disposed close to the light-guiding unit. Conventionally, a gap between the light-emitting portion of the light-emitting diode and the light-guiding unit is designed to be smaller than about 1 mm. However, the gap between the light-emitting portion of the light-emitting diode and the light-guiding unit becomes greater than the designed value due to margins in a manufacturing process.

For example, the light-emitting diode is spaced apart from the light-guiding unit by a distance greater than a designed range because of a cutting margin caused by a process of cutting a printed circuit film on which the light-emitting diode is mounted, and an injection margin caused by a process of injection-molding the light-guiding unit. Therefore, a portion of light generated by the light-emitting diode is lost and is not guided by the light-guiding unit, so that power consumption of the light-emitting module and a display apparatus having the light-emitting module increases.

SUMMARY OF THE INVENTION

Embodiments of the present invention provide a light-emitting module capable of improving a light-using efficiency, a method of manufacturing the light-emitting module, and a display device having the light-emitting module.

In an exemplary embodiment according to the present invention, a light-emitting module includes a light guiding body, a light-emitting unit and a fluorescent unit. The light-guiding unit has a groove. The light-emitting unit is disposed in a portion of the groove and emits a first light. The fluorescent unit is disposed in a remaining portion of the groove and receives the first light. Also, the fluorescent unit emits a second light toward an inner side surface of the groove, the second light having a different wavelength range than the first light.

For example, the light-emitting unit includes a light-emitting diode emitting a blue-colored light as the first light. For example, the fluorescent unit includes a yellow fluorescent unit, a red fluorescent unit and/or a green fluorescent unit changing the blue-colored light into a white-colored light as the second light.

For example, the light-emitting module may further include a power printed circuit film that is electrically connected to the light-emitting unit and provides a driving current to the fluorescent unit for emitting light. Also, the light-emitting unit can be mounted on the power printed circuit film and is inserted into the groove in which the fluorescent unit is formed.

A method of manufacturing a light module, according to an exemplary embodiment of the present invention, includes forming a groove in a light-guiding body. A fluorescent unit is formed in a portion of the groove. The fluorescent unit includes a fluorescent material changing blue-colored light into a white-colored light and emitting the white-colored light to an inner side surface of the groove. A light-emitting unit being disposed on a power printed circuit film is inserted into a remaining portion of the groove. The light-emitting unit includes a blue-colored light-emitting diode emitting a blue-colored light.

For example, the light-emitting unit includes a blue-colored light-emitting diode emitting a blue-colored light, and the fluorescent unit includes a fluorescent material changing the blue-color light into a white-colored light and emitting the white-colored light toward an inner side surface of the groove.

A display device, according to an exemplary embodiment of the present invention, includes a light-emitting module and a display panel. The light-emitting module includes a light guiding body, a light-emitting unit and a fluorescent unit. The light-guiding unit has a groove. The light-emitting unit is disposed in a portion of the groove and emits a first light. The fluorescent unit is disposed in a remaining portion of the groove and receives the first light. Also, the fluorescent unit emits a second light to an inner side surface of the groove, and the second light has a different wavelength range than the first light. The display panel displays an image based on a light received from the light guiding body.

For example, the light-emitting unit includes a light-emitting diode emitting a blue-colored light and the fluorescent unit includes a fluorescent material changing the blue-colored light into a white-colored light.

For example, the light-emitting module may further include a driving portion and a power printed circuit film. The driving portion outputs a driving current of the light-emitting unit and the power printed circuit film electrically connects the driving portion to the light-emitting unit.

For example, the light-guiding unit includes a light-emitting surface, an opposite surface and a side surface. The groove may be formed in a direction from the light-emitting surface to the opposite surface or in a direction from the opposite surface to the light-emitting surface. The groove may be formed at the side surface.

According to the embodiments of the present invention, loss of the first and second light is reduced, light-using efficiency of the light-emitting module is increased and a power consumption of the display device is reduced.

BRIEF DESCRIPTION OF THE DRAWINGS

Exemplary embodiments of the present invention can be understood in more detail from the following descriptions taken in conjunction with the accompanying drawings wherein.

DESCRIPTION OF THE EXEMPLARY EMBODIMENTS

Exemplary embodiments of the present invention are described more fully hereinafter with reference to the accompanying drawings. This invention may, however, be embodied in many different forms and should not be construed as limited to the embodiments set forth herein.

It will be understood that when an element or layer is referred to as being "on," or "connected to" another element or layer, it can be directly on or connected to the other element or layer or intervening elements or layers may be present. Like numbers refer to like elements throughout. As used herein, the term "and/or" includes any and all combinations of one or more of the associated listed items.

Figure 1:
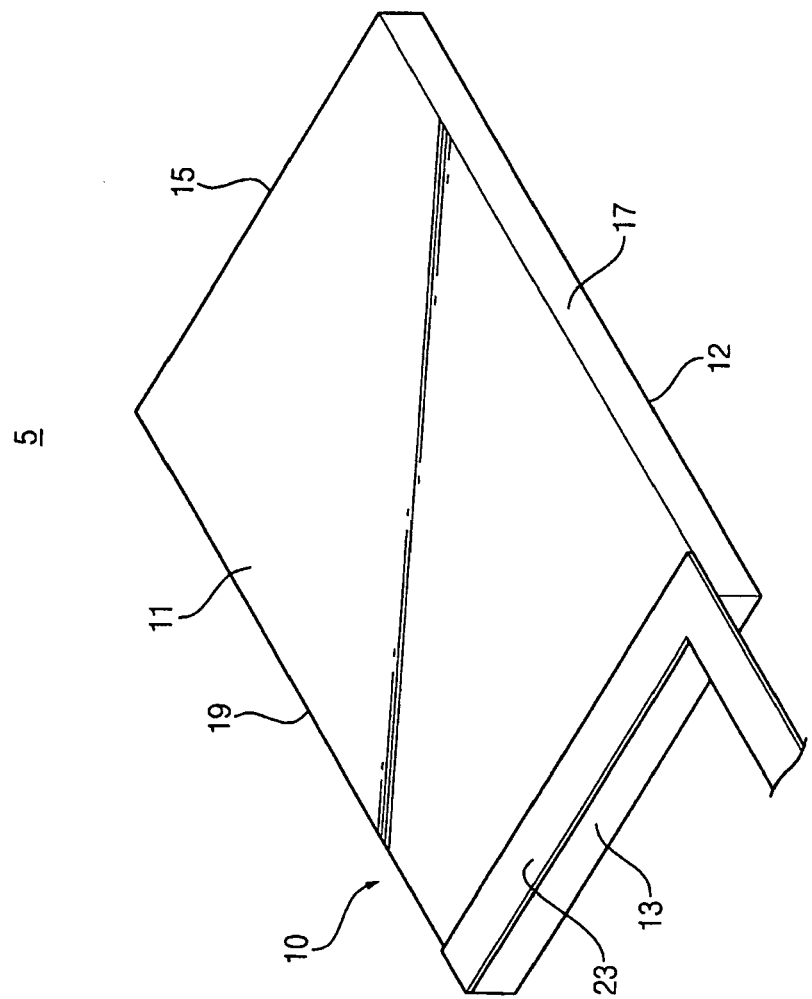
FIG. 1 is a perspective view illustrating a light-emitting module in accordance with an embodiment of the present invention.
Figure 2:
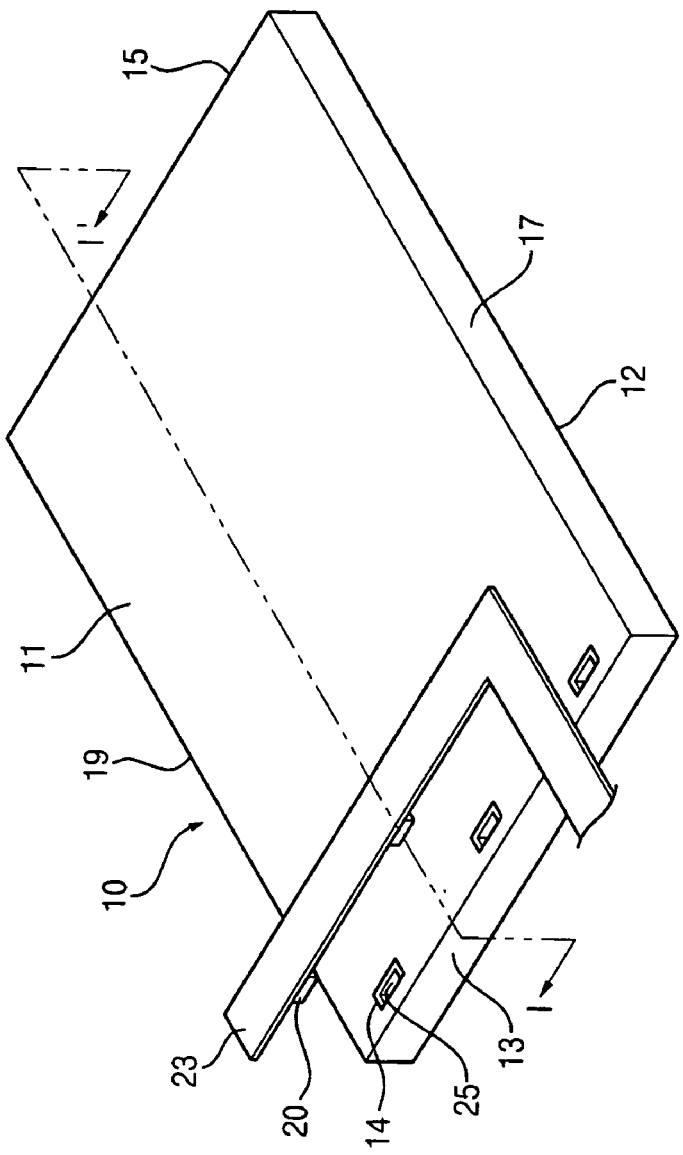
FIG. 2 is an exploded perspective view illustrating the light-emitting module in FIG. 1 in accordance with an embodiment of the present invention.

FIG. 1 is a perspective view illustrating the light-emitting module in accordance with an embodiment of the present invention, and FIG. 2 is an exploded perspective view illustrating the light-emitting module in FIG. 1.

The light-emitting module provides light to a bottom chassis of a display panel in a display device. Referring to FIGS. 1 and 2, the light-emitting module 5 includes a light-guiding unit 10, light-emitting units 20 and fluorescent units 25.

The light-guiding unit 10 guides and emits the light that is emitted from the light-emitting unit 20 and passes through the fluorescent unit 25. The light-guiding unit 10 may include, for example, a light-scattering and light-guiding material that is capable of transmitting light, and has a thermal resistance, a chemical resistance and a high strength. For example, the light-scattering and light-guiding material may include polymethymethacrylate, polyamide, polyimide, polypropylene and/or polyurethane.

The light-guiding unit 10 may have a plate shape. The light-guiding unit 10 includes a first surface 11, a second surface 12, a first side surface 13, a second side surface 15, a third side surface 17 and a fourth side surface 19. Alternatively, the light-guiding unit 10 may have a wedge-shape, such that a thickness of the light-guiding unit 10 increases along a direction from one side surface to another side surface, for example, from the first side surface 13 to the second side surface 15.

The first and second surfaces 11 and 12 are disposed oppositely to face each other. The first, second, third and fourth side surfaces 13, 15, 17 and 19 connect the first surface 11 to the second surface 12. The first and second side surfaces 13 and 15 are disposed opposite to each other. The third and fourth side surfaces 17 and 19 are disposed opposite to each other and connect the first side surface 13 to the second side surface 15.

Figure 3:
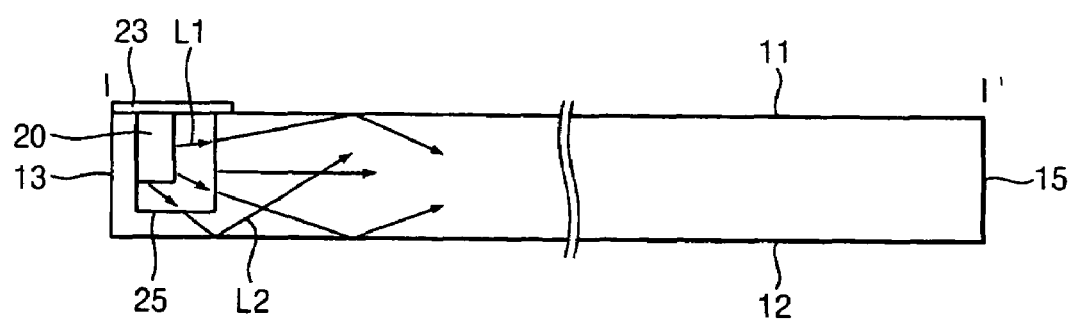
FIG. 3 is a cross-sectional view illustrating the light-emitting module taken along a line I-I' in FIG. 2 in accordance with an embodiment of the present invention.

FIG. 3 is a cross-sectional view illustrating the light-emitting module taken along a line I-I' in FIG. 2.

Referring to FIGS. 1 to 3, the light-guiding unit 10 includes grooves 14. The grooves 14 provide receiving spaces for light-emitting units 20 and a fluorescent unit 25. Positions of the grooves 14 may vary. For example, the grooves 14 may be disposed on at least one of the first surface 11, the second surface 12 and the first, second, third and fourth side surfaces 13, 15, 17 and 19. A number of the grooves 14 may be changed according to an emitted light-intensity desired at the light-emitting apparatus. For example, three of the grooves 14, referring to FIG. 2, are formed along an edge portion of the first surface 11 adjacent to the first side surface 13.

A groove 14 has a predetermined depth. A portion of the first surface 11 is recessed toward the second surface 12 to form the groove 14. The groove 14 includes a base surface and an inner side surface. The depth of the base surface is greater than a length of the light-emitting unit 20. The base surface may have a rectangular shape. Alternatively, the base surface may have a curved shape such as a circle shape or an oval shape.

The inner side surface of the groove 14 connects the first surface 11 with four edges of the bottom surface of the groove 14. The inner side surface includes first to fourth inner surface portions connected with the four edges respectively. The first, second, third and fourth inner surface portions correspond to the first, second, third and fourth side surfaces 13, 15, 17 and 19 of the light-guiding unit 10. The bottom surface and the first, second, third and fourth inner side surface portions define a receiving space.

The fluorescent unit 25 is formed in the receiving space except for the space where the light-emitting unit 20 is received. For example, the fluorescent unit 25 having a predetermined thickness is formed at the bottom surface and the second to fourth inner side surface portions. The fluorescent unit 25 is also formed at a bottom portion of the first inner side surface portion. As a result, the fluorescent unit 25 and the first inner side surface portion define a receiving space for receiving the light-emitting unit 20. Alternatively, the fluorescent unit 25 having a predetermined thickness may be formed at the bottom surface and the first to fourth inner side surface portions.

For example, the fluorescent unit 25 may include a yellow fluorescent unit 25. For example, the yellow fluorescent unit 25 may include $Y_3Al_5O_{12}$ (YAG). The yellow fluorescent unit 25 emits white-colored light when white-colored light enters the yellow fluorescent unit 25. Furthermore, the yellow fluorescent unit 25 emits white-colored light when blue-colored light enters the fluorescent unit 25.

Alternatively, the fluorescent unit 25 may include a red fluorescent unit and a green fluorescent unit. Particularly, the fluorescent unit 25 can be formed by mixing the red and green fluorescent unit in a predetermined ratio, so that the fluorescent unit 25 emits white-colored light when blue-colored light enters the fluorescent unit 25.

Alternatively, color characteristics of the fluorescent unit 25 may vary according to a wavelength range of the light desired from the light-emitting module 5.

The light-emitting unit 20 is disposed in the groove 14 and emits a first light L1. As mentioned above, the light-emitting unit 20 is disposed at a receiving space defined by the fluorescent unit 25 and the first inner side surface portion of the groove 14. The fluorescent unit 25 receives the first light L1 and emits a second light L2 having a different wavelength range compared with the first light L1.

The light-emitting unit 20 may include a point light source that has a small volume, a light weight and small power consumption. For example, the light-emitting unit 20 may include a blue-colored light-emitting diode including gallium nitride (GaN). The light-emitting unit 20 emits the first light L1, which corresponds to the blue-colored light. The fluorescent unit 25 receives the blue-colored light and emits the second light L2. Alternatively, the light-emitting unit 20 may include a red-colored light-emitting diode emitting a red-colored light and a green-colored light-emitting diode emitting a green-colored light.

The light-emitting module 5 may further include a power printed circuit film 23. The power printed circuit film 23 includes a base film, an electrical pattern and an insulating layer. The base film includes an insulating resin and has a flexible characteristic. The electrical pattern is disposed on the base film. The insulating layer covers the electrical pattern and insulates the electrical pattern.

The light-emitting unit 20, for example, a blue-colored light-emitting diode, is disposed on the insulating layer of the power printed circuit film 23 and is inserted into the groove 14. The electrode terminal of the light-emitting unit is electrically connected with the electrical pattern. The power printed circuit film 23 provides a driving current from an external device to the light-emitting unit 20.

For example, the blue-colored light-emitting diode 20 emits blue-colored light L1. The fluorescent unit 25 receives the blue-colored light L1 and emits white-colored light L2. The white-colored light L2 passes through the second to fourth inner side surface portions of the groove 14 and enters the light-guiding unit 10. The white-colored light L2 repeats reflection and diffusion inside the light-guiding unit 10 and advances toward to the second side surface 15. When the first surface 11 is used as a light-emitting surface, and a condition for exiting is satisfied, the guided white-colored light L2 exits from the light-guiding unit 10 through the first surface 11.

Figure 4:
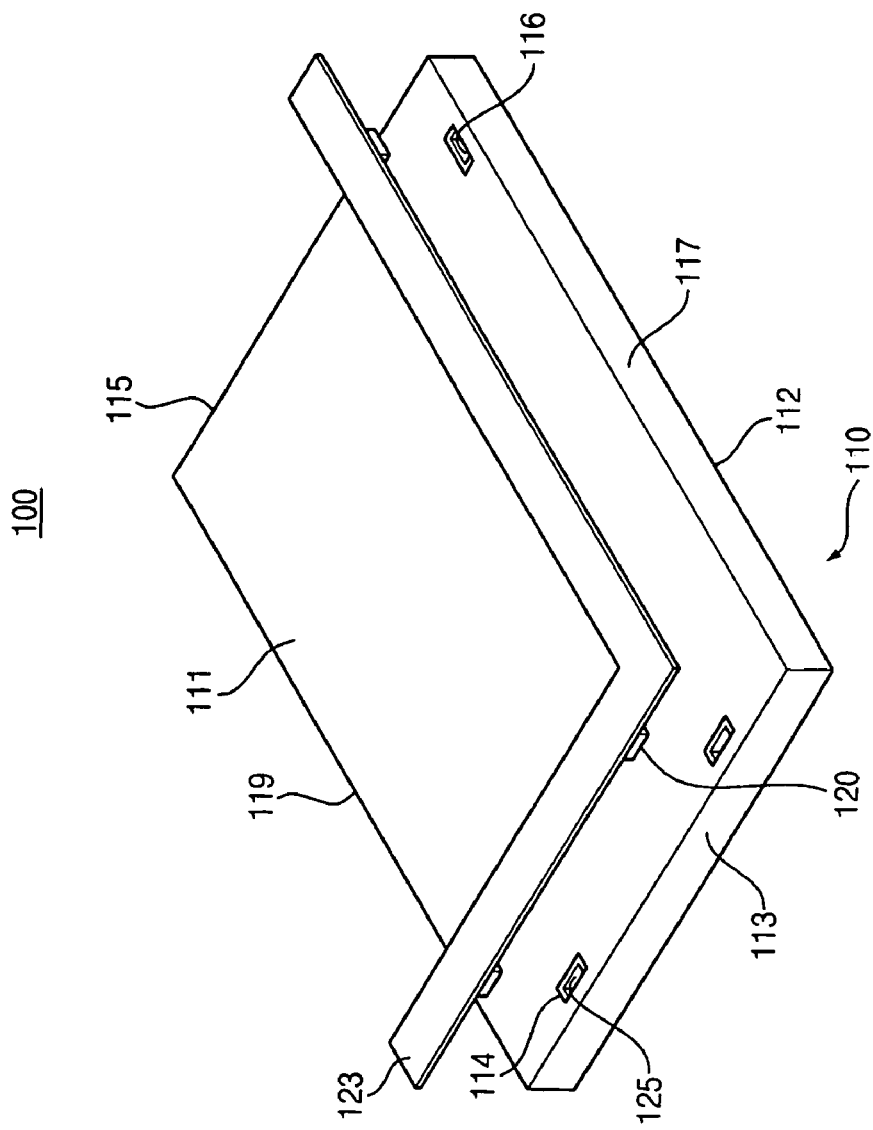
FIG. 4 is an exploded perspective view illustrating a light-emitting module in accordance with an embodiment of the present invention.

FIG. 4 is an exploded perspective view illustrating a light-emitting module in accordance with an embodiment of the present invention.

Referring to FIG. 4, the light-emitting module 100 includes a light-guiding unit 110, light-emitting units 120, fluorescent units 125 and a power printed circuit film 123.

The light-guiding unit 110 is substantially the same as the light-guiding unit described in connection with FIGS. 1 to 3 except with respect to at least positions of grooves 114 and 116.

Two of the grooves 114 are disposed adjacent to a first side surface 113 and one of the grooves 116 is disposed adjacent to a third side surface 117. Each of the grooves 114, 116 are disposed at edge portions of a first surface 111 of the light-guiding unit 110. The grooves 114, 116 include a base surface and an inner side surface. A light-diffusing pattern is disposed at the inner side surface of the grooves 114, 116. The light-diffusing pattern may include a prism-pattern extending along a direction from the first surface 111 to a second surface 112 of the light-guiding unit 110.

The light-emitting unit 120 and the fluorescent unit 125 are substantially the same as the light-emitting unit 20 and the fluorescent unit 25 described in connection with FIGS. 1, 2 and 3. The light-emitting unit 120 is disposed at a portion of the base surface and the inner side surface. The fluorescent unit 125 and a remaining inner side surface define a receiving space where the light-emitting unit 120 is disposed. The light-emitting unit 120 is disposed on the power printed circuit film 123 and is inserted into the receiving space.

The power printed circuit film 123 is substantially the same as the power printed circuit film 23 described in connection with FIGS. 1, 2 and 3. The power printed circuit film 123 is disposed over the grooves 114, 116 and extends along an edge portion of the first surface 111 corresponding to the first and third side surface 113 and 117.

Figure 5:
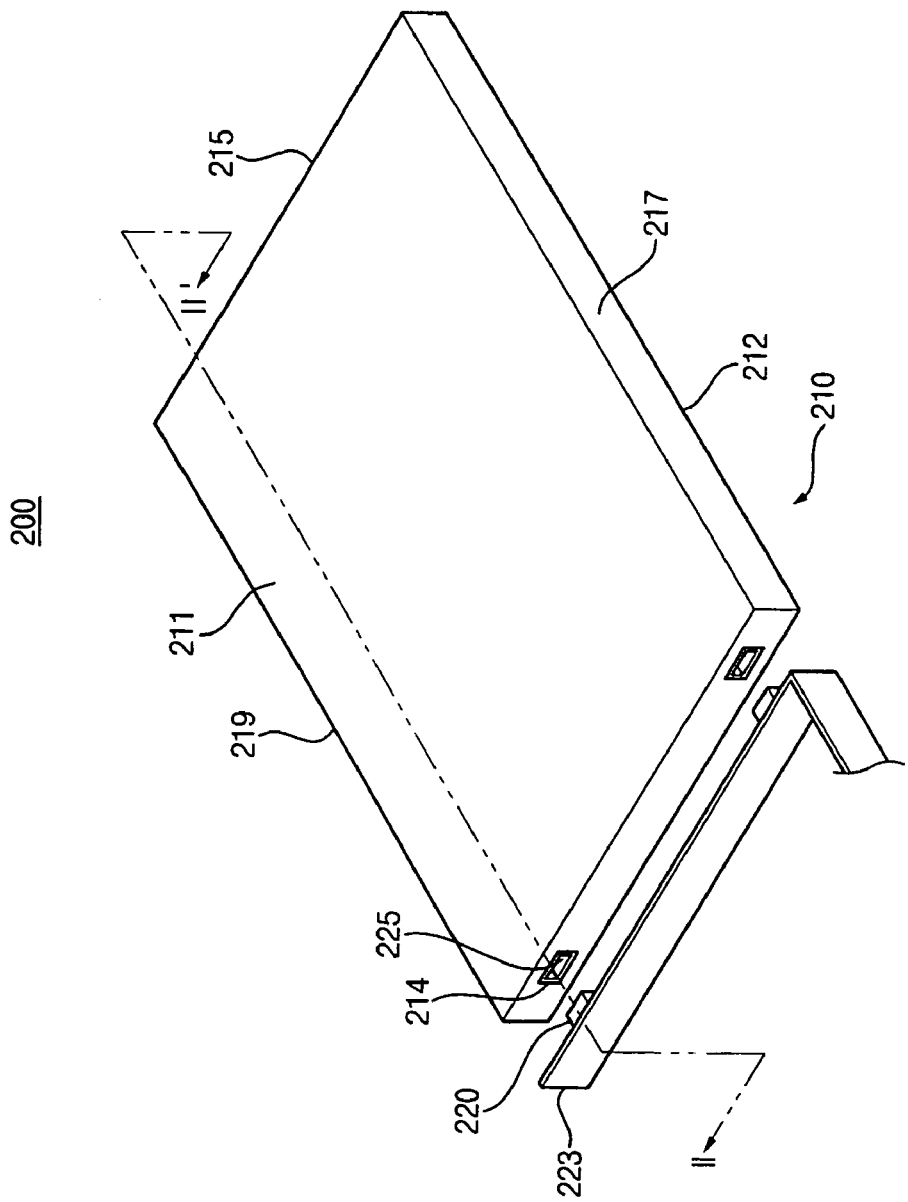
FIG. 5 is an exploded perspective view illustrating a light-emitting module in accordance with an embodiment of the present invention.
Figure 6:
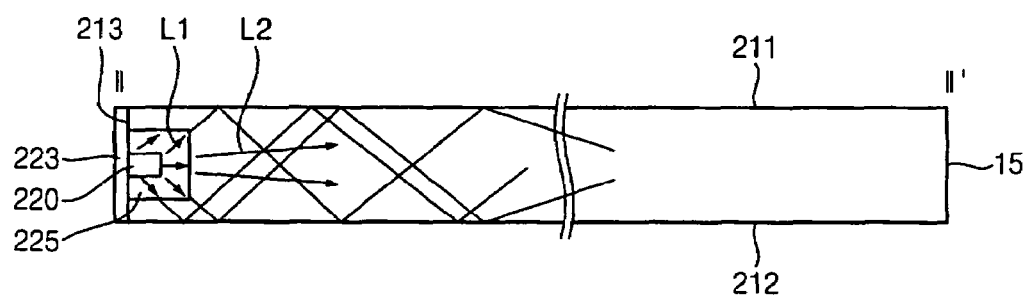
FIG. 6 is a cross-sectional view illustrating the light-emitting module taken along a line II-II' in FIG. 5 in accordance with an embodiment of the present invention.

FIG. 5 is an exploded perspective view illustrating a light-emitting module in accordance with an example embodiment of the present invention, and FIG. 6 is a cross-sectional view illustrating the light-emitting module taken along a line II-II' in FIG. 5.

Referring to FIGS. 5 and 6, the light-emitting module 200 includes a light-guiding unit 210, light-emitting units 220, fluorescent units 225 and a power printed circuit film 223.

The light-guiding unit 210 is substantially the same as the light-guiding unit 10 described in connection with FIGS. 1, 2 and 3 except with respect to at least a position and a number of a grooves 214. The grooves 214 are disposed at a first side surface of the light-guiding unit 210. A portion of the first side surface 213 is recessed toward a second side surface 215 of the light-guiding unit 210 to form the grooves 214, so that the grooves have a predetermined depth. The grooves 214 include a base surface and an inner side surface. The base surface is formed parallel with the first and second side surfaces 213 and 215. The inner side surface connects the base surface and the first side surface 213.

The fluorescent unit 225 having a predetermined thickness is formed at a whole surface of the lower surface and the inner side surface. The light-emitting units 220 are disposed on the power printed circuit film 223 and are inserted into the grooves 214 being defined by the fluorescent units 225. The light-emitting unit 220 may include a light-emitting diode. In order for the light-emitting diode to be separated from the groove 214, the light-emitting module 200 may further include an adhesive member, such as an adhesive tape. The adhesive tape is disposed between the first side surface 213 and the power printed circuit film 223.

Figure 7:
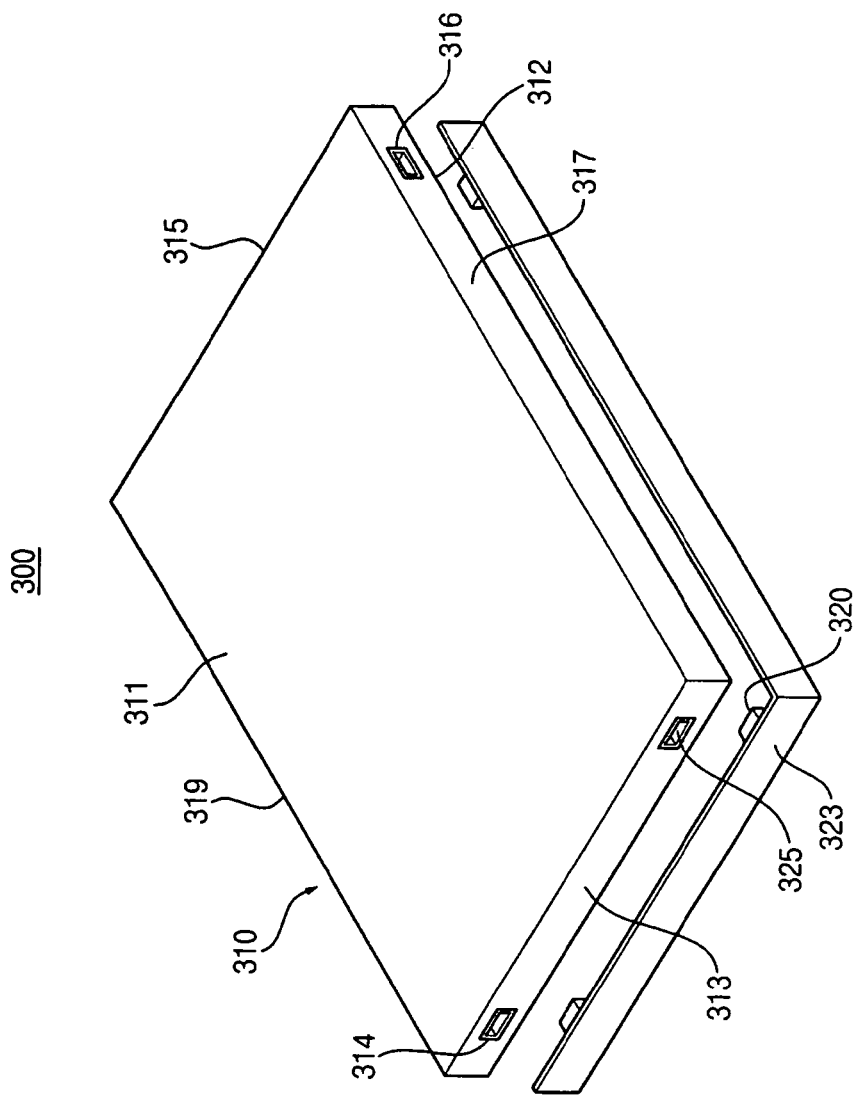
FIG. 7 is an exploded perspective view illustrating a light-emitting module in accordance with an embodiment of the present invention.

FIG. 7 is an exploded perspective view illustrating a light-emitting module in accordance with an embodiment of the present invention.

Referring to FIG. 7, the light-emitting module 300 includes a light-guiding unit 310, light-emitting units 320, fluorescent units 325 and a power printed circuit film 323.

The light-guiding unit 310 is substantially the same as the light-guiding unit 210 described in connection with FIGS. 5 and 6 except with respect to at least a the addition of groove 316. Two of the grooves 314 are disposed at a first side surface 313 of the light-guiding unit 310 and one of the grooves 316 at a third side surface 317. The grooves 314 and 316 include a base surface and an inner side surface. The fluorescent units 325, having a predetermined thickness, are formed at a whole surface of the base surface and the inner side surface. The light-emitting units 320 are disposed on the power printed circuit film 323 and are inserted into the grooves 314, and 316 being defined by the fluorescent units 325.

The power printed circuit film 323 is substantially the same as the power printed circuit film 223 described in connection with FIGS. 5 and 6 except with respect to a shape thereof. The power printed circuit film 323 covers the grooves 314 and extends along the first side surface 313. Also, the power printed circuit film 323 is folded and extended along the third side surface 317 to cover groove 316.

According to an exemplary embodiment of the present invention, the method of manufacturing the light-emitting module includes forming a groove at a light guiding body, forming a fluorescent unit at a portion of the groove and inserting a light-emitting unit being disposed on the power printed circuit film into a rest of the groove.

The groove is formed at the light-guiding unit having a plate shape through mechanical processing. Alternatively, the groove may be formed by using a mold during a process in which the light-guiding unit is injected for molding.

Then, the fluorescent unit having a predetermined thickness is formed at a base surface and an inner side surface of the groove. For example, the fluorescent unit may include a YAG fluorescent unit. In order for the YAG fluorescent unit to be fixed at the groove in a desired shape, the YAG fluorescent unit may be compressed by a compressing member.

Then, the power printed circuit film having the light-emitting unit mounted thereon is disposed to cover the groove. The light-emitting unit is inserted into the groove where the fluorescent unit is formed. The light-emitting unit may include a blue-colored light-emitting diode.

Figure 8:
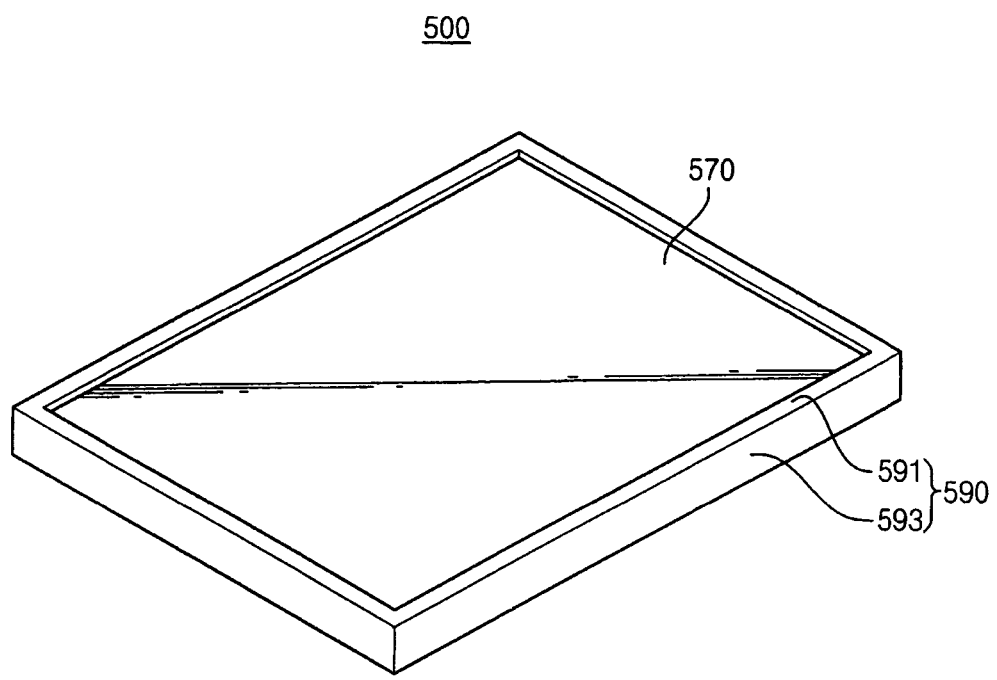
FIG. 8 is a perspective view illustrating a display device in accordance with an embodiment of the present invention.
Figure 9:
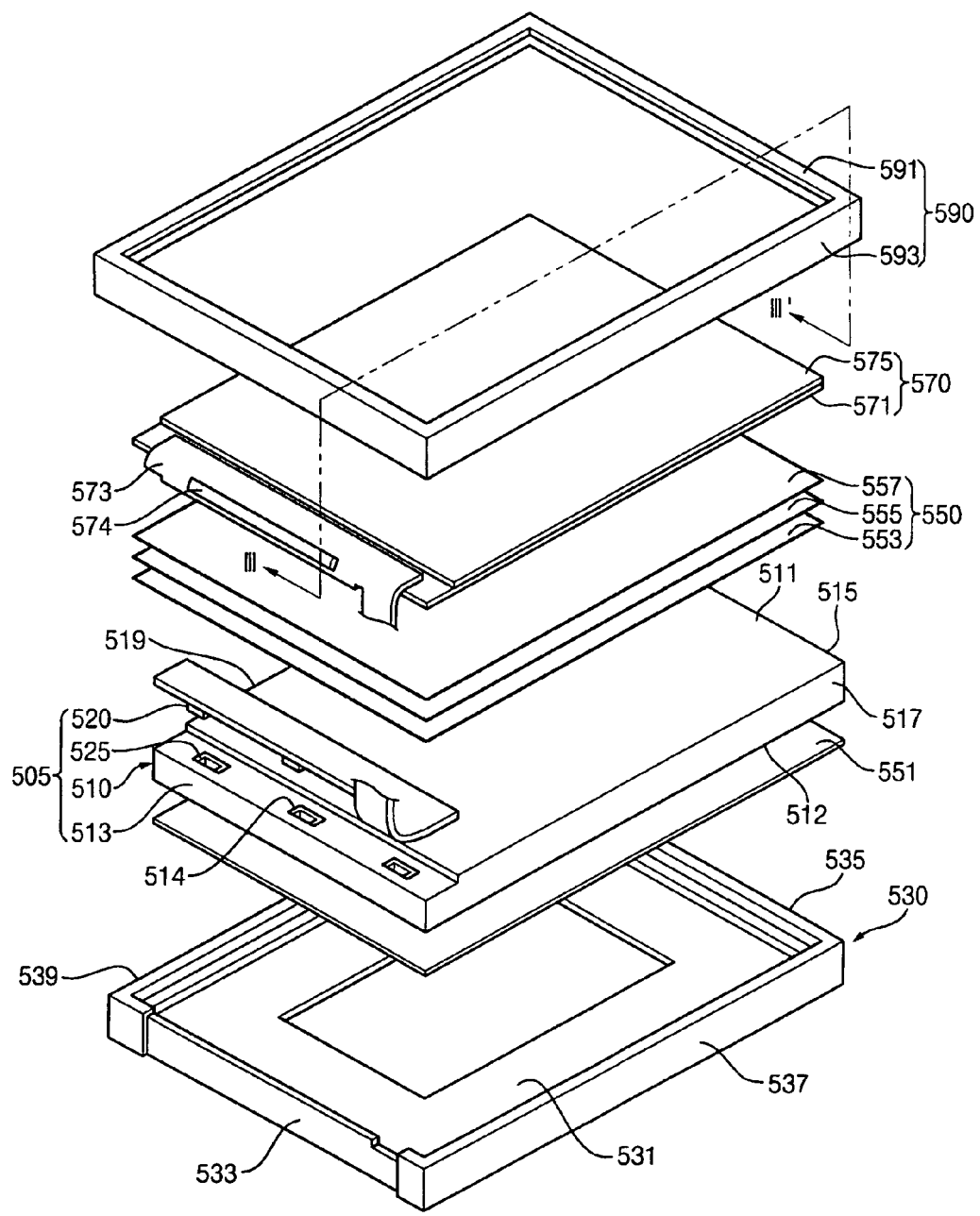
FIG. 9 is an exploded perspective view illustrating the display device in FIG. 8 in accordance with an embodiment of the present invention.

FIG. 8 is a perspective view illustrating a display device in accordance with an embodiment of the present invention, and FIG. 9 is an exploded perspective view illustrating the display device in FIG. 8.

Referring to FIGS. 8 and 9, the display device 500 includes a light-emitting module 505 and a display panel 570. The light-emitting module 505 emits a white-colored light and the display device 570 displays an image based on the white-colored light.

The light-emitting module 505 may include a light-guiding unit 510, light-emitting units 520 and fluorescent units 525. The light-emitting module 505 is substantially the same as the light-emitting module 5 described in connection with FIGS. 1 to 3 except with respect to at least the light-guiding unit 510.

The light-guiding unit 510 includes a light-emitting surface 511, an opposite surface 512, a first side surface 513, a second side surface 515, a third side surface 517 and a fourth side surface 519. The light-emitting surface 511 is disposed opposite to the opposite surface 512. The first, second, third and fourth side surfaces 513, 515, 517 and 519 connect the light-emitting surface 511 to the opposite surface 512. The first side surface 513 is disposed opposite to the second side surface 515 and the third side surface 517 is disposed opposite to the fourth side surface 519. Also, the third and fourth side surfaces 517 and 519 connect the first side surface 513 to the second side surface 515.

A guiding stepped portion is formed at an edge portion of the light-emitting surface 511 adjacent to the first side surface 513. The guiding stepped portion has a predetermined depth. A power printed circuit film 523 is disposed at the guiding stepped portion. A depth of the guiding stepped portion may be larger than a thickness of the printed circuit film 523.

Also, three grooves 514 providing receiving spaces for the light-emitting units 520 and the fluorescent units 525 are formed at a base portion of the guiding stepped portion. A shape of the grooves 514 is substantially the same as the shape of the grooves 14.

The light-emitting unit 520 may include a blue-colored light-emitting diode emitting a blue-colored light. The fluorescent unit 525 may include a fluorescent material receiving the blue-colored light and emitting a white-colored light. For example, the fluorescent unit 525 may include a YAG fluorescent unit 525. Alternatively, the fluorescent unit 525 may include a red-colored fluorescent unit and a green-colored fluorescent unit.

The light-emitting module 505 may further include a power printed circuit film 523 and a driving portion 574. The power printed circuit film 523 is substantially the same as the power printed circuit film 23 described in connection with FIGS. 1 to 3. The driving portion 574 is electrically connected with the power printed circuit film 523 through a panel printed circuit film 573 as viewed in FIG. 10. The power printed circuit film 523 provides the light-emitting units 520, for example, blue-colored light-emitting diodes, with a driving current outputted from the driving portion 574 to emit light.

The light-emitting units 520 are disposed on the power printed circuit film 523 and are inserted into the grooves 514. The power printed circuit film 523 is disposed at the guiding stepped portion. As a result, the power printed circuit film 523 does not protrude from the first surface 511 of the light-guiding unit 510. The power printed circuit film 523 may be disposed on the same plane with the first surface 511.

Figure 10:
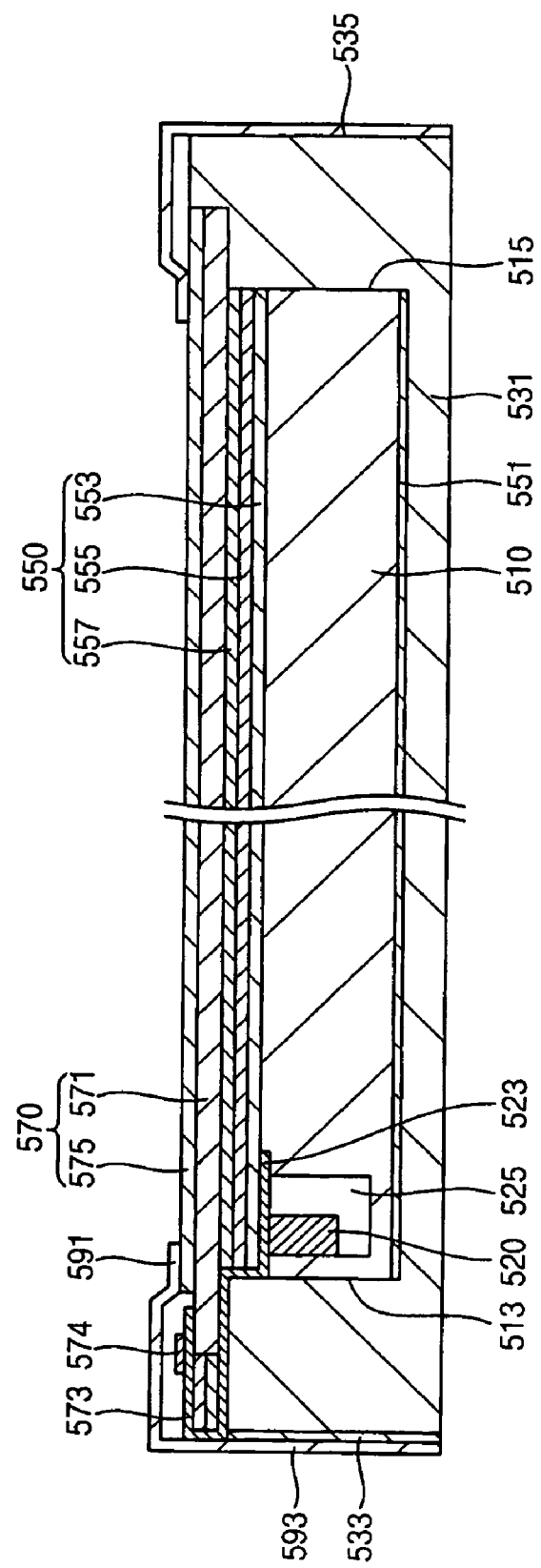
FIG. 10 is a cross-sectional view illustrating the display device taken along a line III-III' in FIG. 9 in accordance with an embodiment of the present invention.

FIG. 10 is a cross-sectional view illustrating the display device taken along a line III-III' in FIG. 9.

Referring to FIGS. 9 and 10, the display device 500 may further include a receiving container 530 and an optical sheet 550.

The receiving container 530 receives the light-emitting module 505, the optical sheet 550 and the display panel 570. The receiving container 530 includes a bottom plate 531 and a first sidewall 533, a second sidewall 535, a third sidewall 537 and a fourth sidewall 539.

The light-guiding unit 510 having a plate shape is disposed on the bottom plate 531. A middle portion of the bottom plate 531 may be open to reduce a weight of the receiving container 530. The first, second, third and fourth sidewalls 533, 535, 537 and 539 are disposed at a peripheral portion of the bottom plate 531 corresponding to the first, second, third and fourth side surfaces 513, 515, 517 and 519 of the light-guiding unit 510.

The first sidewall 533 is disposed opposite to the second sidewall 535 and the third sidewall 537 is disposed opposite to the fourth sidewall 539. Also, the third and fourth sidewalls 537 and 539 connect the first sidewall 533 to the second sidewall 535. A stepped portion is disposed at an inner portion of the first, second, third and fourth sidewalls 533, 535, 537 and 539. An external portion of the first, second, third and fourth sidewalls 533, 535, 537 and 539 may be higher than an inner portion thereof by the stepped portion.

A guiding groove is formed at the first sidewall 533. The guiding groove extends from an upper portion of the stepped portion to the inner portion of the first sidewall 533, an upper portion of the first sidewall 533 and the external portion of the first sidewall 533. The guiding groove guides the power printed circuit film 523 and the panel printed circuit film as stated below.

The optical sheet 550 is disposed on the light-guiding unit 510. The optical sheet 550 improves optical characteristics, for example, luminance uniformity, of the white-colored light from the light-guiding unit 510, and emits the white-colored light to the display panel 570. The optical sheet 550 includes a reflective sheet 551, a diffusion sheet 553 and prism sheets 555 and 557.

The reflective sheet 551 faces the opposite surface 512. The reflective sheet 551 reflects the white-colored light leaked from the opposite surface 512 toward the opposite surface 512.

The diffusion sheet 553 is disposed on the light-emitting surface 511. The diffusion sheet 553 improves the luminance uniformity of the white-colored light emitted from the light-guiding unit 510. The prism sheets 555 and 557 are disposed on the diffusion sheet 553. The prism sheets 555 and 557 improve the front-view luminance of the white-colored light emitted from the diffusion sheet 553.

The display panel 570 receives light emitted from the optical sheet 550 and coverts the emitted light into an image. The display panel 570 is disposed at the stepped portion being formed at the first, second, third and fourth sidewalls 533, 535, 537 and 539. The display panel 570 includes a first substrate 571, a second substrate 575 and a liquid crystal layer (not shown).

The first substrate 571 includes a lower substrate and switching elements. The lower substrate may include an optically transparent glass substrate. A plurality of gate lines is formed along a first direction (e.g., a horizontal direction) on the lower substrate. A plurality of data lines is formed along a second direction (e.g., a vertical direction) that is substantially perpendicular to the first direction on the lower substrate. The gate and data lines define a plurality of pixel regions, and the pixel regions are arranged in a matrix shape.

The switching elements are disposed in the pixel regions. For example, the switching element may include a thin film transistor (not shown). A source terminal of the thin film transistor is electrically connected with the data line and a gate terminal of the thin film transistor is electrically connected with the gate line. Also, a drain terminal of the thin film transistor is electrically connected with one of the pixel electrodes including an optically transparent and electrically conductive material.

The second substrate 575 faces the first substrate 571 and is spaced apart from the first substrate 571 by a predetermined distance. The second substrate 575 includes an upper substrate and color pixels. The color pixels are arranged in a matrix shape on the upper substrate such that the color pixels correspond to the pixel electrodes disposed in the pixel regions, respectively. The color pixels may include RGB color pixels to display a specific color. A common electrode is disposed on a whole portion of the upper substrate having the color pixels formed thereon. The common electrode may include an optically transparent and electrically conductive material.

When a gate signal is applied to the gate terminal of the thin film transistor, the thin film transistor is turned on to generate an electric field between the pixel electrode and the common electrode. An arrangement of liquid crystal molecules of the liquid crystal layer disposed between the first and second substrates 571 and 575 is changed in response to the electric field. Thus, a light transmittance of the liquid crystal layer is changed to display a desired image.

The display panel 570 may further include a panel printed circuit film 573. A first edge portion of the panel printed circuit film 573 is electrically connected with the display panel 570. A second edge portion of the panel printed circuit film 573 is electrically connected with the power printed circuit film 523. A driving portion controlling panel driving signals, such as the gate voltage and data voltage, is disposed on the panel printed circuit film 573.

The display device 500 may further include a top chassis 590. The top chassis 590 exposes an effective display area of the display panel 570. The top chassis 590 is combined with the receiving container 530. The top chassis 590 includes an upper plate 591 covering an edge portion of the display panel 570 and side plates 593 corresponding to the first, second, third and fourth sidewalls 533, 535, 537 and 539.

Figure 11:
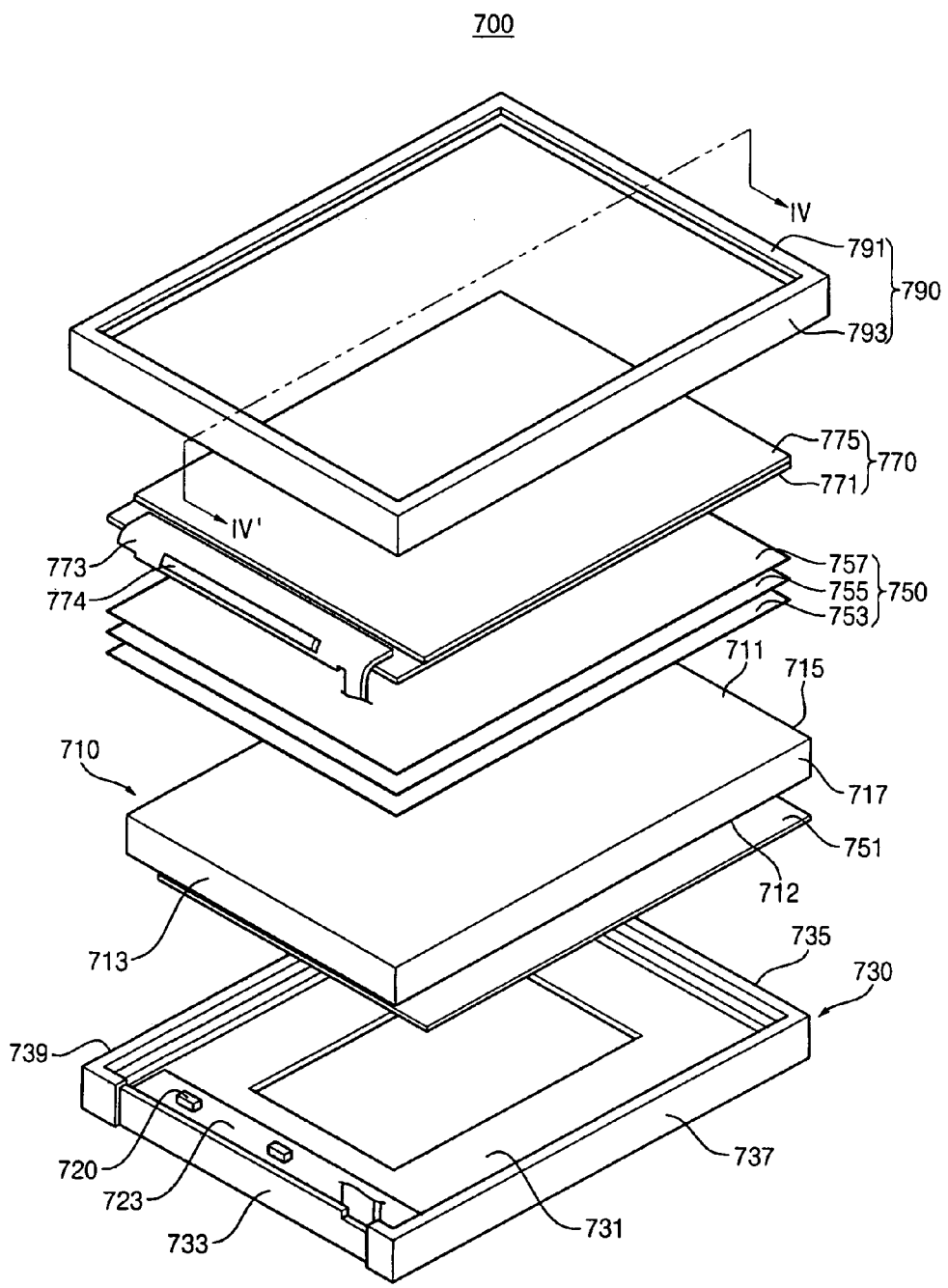
FIG. 11 is an exploded perspective view illustrating a display device in accordance with an embodiment of the present invention.
Figure 12:
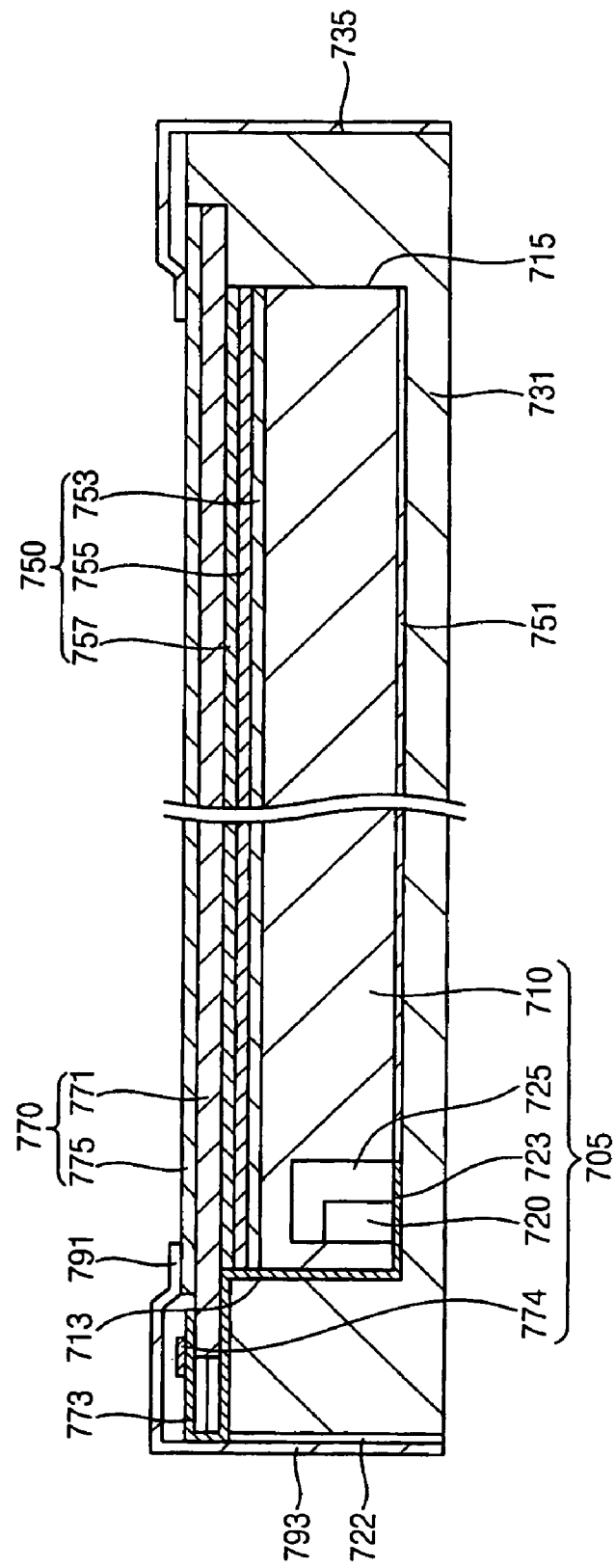
FIG. 12 is a cross-sectional view illustrating the display device taken along a line IV-IV' in FIG. 11 in accordance with an embodiment of the present invention.

FIG. 11 is an exploded perspective view illustrating a display device in accordance with an embodiment of the present invention, and FIG. 12 is a cross-sectional view illustrating the display device taken along a line IV-IV' in FIG. 11.

Referring to FIGS. 11 and 12, the display device 700 includes a light-emitting module 705, a receiving container 730, an optical sheet 750, a display panel 770 and a top chassis 790. The display device 700 is substantially the same as the display device 500 described in connection with FIGS. 8, 9 and 10 except with respect to at least the light-emitting module 705 and the optical sheet 750.

The light-emitting module 705 may include a light-guiding unit 710, light-emitting units 720, fluorescent units 725, a power printed circuit film 723 and a driving portion 774. The light-emitting module 705 is substantially the same as the light-emitting module 505 described in connection with FIGS. 8 to 10 except with respect to at least the light-guiding unit 710.

The light-guiding unit 710 is substantially the same as the light-emitting module 10 described in connection with FIGS. 1 to 3. The light-guiding unit 710 includes a light-emitting surface 711 and an opposite surface 712. Grooves 714 formed at the opposite surface 712 provide a receiving space for the light-emitting units 720 and the fluorescent units 725. For example, three grooves 714 are formed at the opposite surface 712 to correspond to the light-emitting units 720. In other words, portions of the opposite surface 712 are recessed toward the light-emitting surface 711 to form the grooves 714.

The power printed circuit film 723 is disposed at a bottom plate 731 adjacent to a first sidewall 733 of the receiving container 730. The light-emitting unit 720, for example, a blue-colored light-emitting diode, disposed on the power printed circuit film 723 is correspondingly arranged to the groove 714 formed on the opposite surface 712.

Alternatively, holes corresponding to the light-emitting units 720 may be formed at a bottom plate 731 adjacent to the first sidewall 733 of the receiving container 730. The power printed circuit film 723 may be disposed on the rear surface of the bottom plate 731, and the light-emitting units 720, for example, the blue-colored light-emitting diodes are inserted into the holes and are disposed inside of the receiving container 730.

The optical sheet 750 is substantially the same as the optical sheet 550 described in connection with FIGS. 9 and 10 except with respect to at least a reflective sheet 751. The reflective sheet 751 is disposed in a remaining portion of the opposite surface 712 where the power printed circuit film 723 is not disposed. Therefore, the reflective sheet 751 in FIG. 11 may be shorter than the reflective sheet 551 in FIG. 9.

Figure 13:
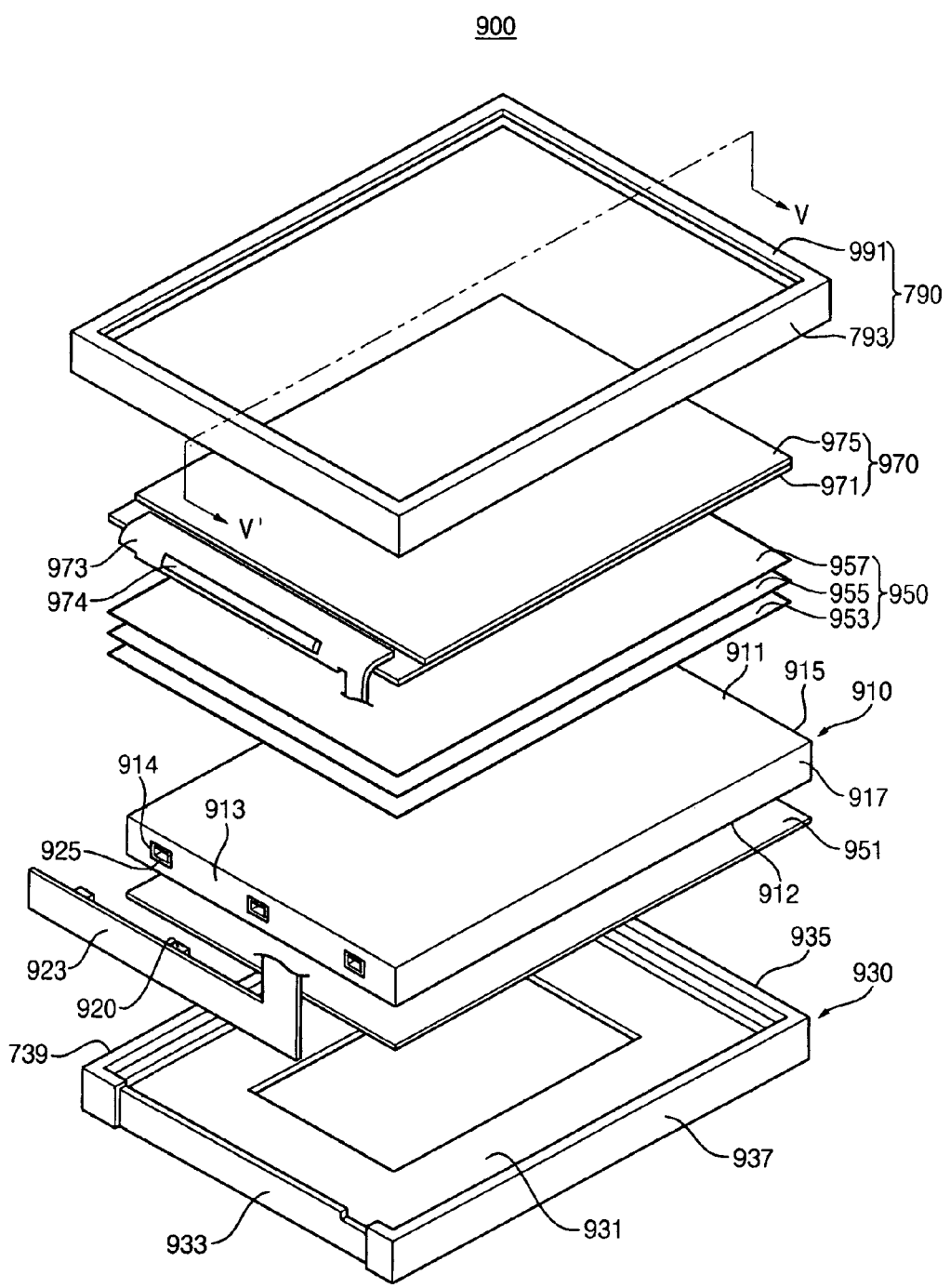
FIG. 13 is an exploded perspective view illustrating a display device in accordance with an embodiment of the present invention.
Figure 14:
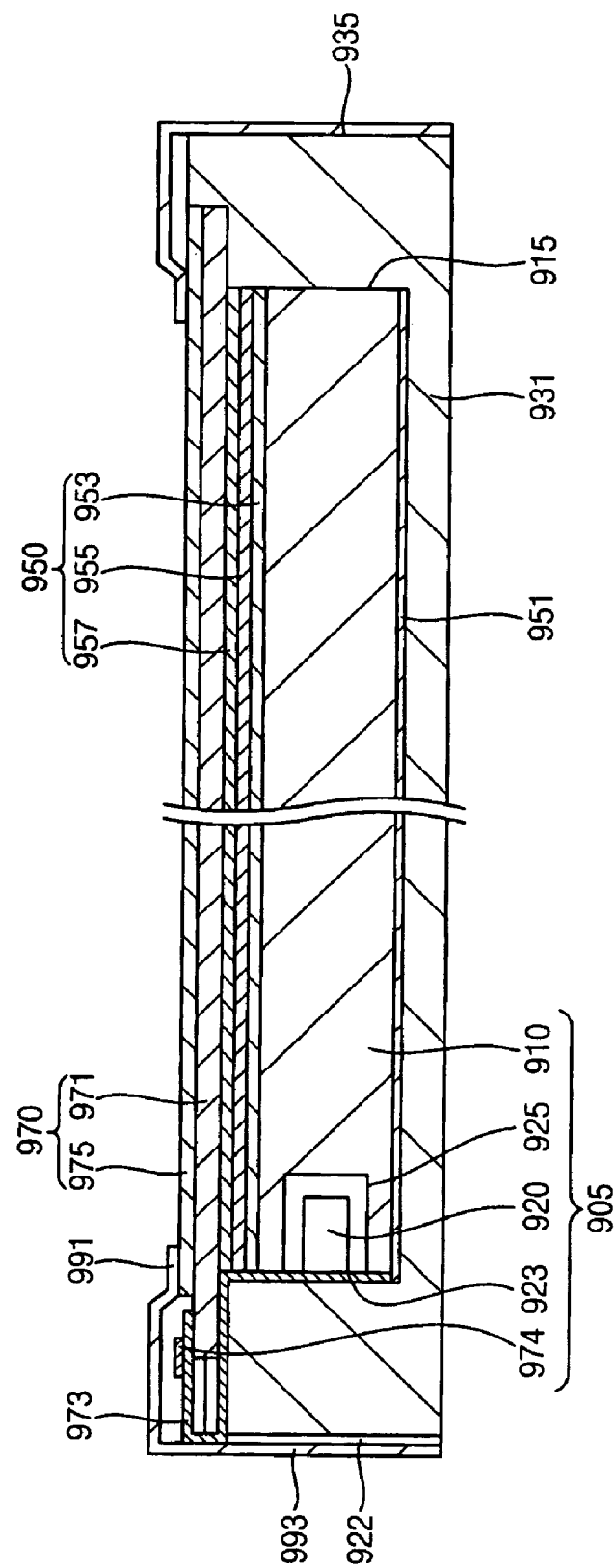
FIG. 14 is a cross-sectional view illustrating the display device taken along a line V-V' in FIG. 13 in accordance with an embodiment of the present invention.

FIG. 13 is an exploded perspective view illustrating a display device in accordance with an embodiment of the present invention, and FIG. 14 is a cross-sectional view illustrating the display device taken along a line V-V' in FIG. 13.

Referring to FIGS. 13 and 14, the display device 900 includes a light-emitting module 905, a receiving container 930, an optical sheet 950, a display panel 970 and a top chassis 990. The display device 900 is substantially the same as the display device 500 described in connection with FIGS. 8 to 10 except with respect to at least the light-emitting module 905.

The light-emitting module 905 may include a light-guiding unit 910, light-emitting units 920, fluorescent units 925, a power printed circuit film 923 and a driving portion 974. The light-emitting module 905 is substantially the same as the light-emitting module 505 described in connection with FIGS. 8, 9 and 10 except that at least grooves 914 are formed at a first side surface 913 of the light-guiding unit 910.

According to the embodiments of the present invention, the light-emitting units and the fluorescent units of the light-emitting module emit the white-colored light being suitable to the backlight of the display device. The fluorescent unit may be integrally formed with the light guiding body. The light-emitting units are inserted into the receiving spaces that the fluorescent units and the grooves provide together.

Therefore, a gap between the fluorescent unit and the light-emitting unit is reduced and the fluorescent unit and the inner side surface are integrally formed. Thus, loss of light generated by a gap between the light-emitting unit and the light-guiding unit is significantly decreased.

The light-emitting unit is accurately disposed at a predetermined position by the groove. Since the gap between a plurality of the luminous bodies and the light-guiding unit is uniform, the luminance uniformity is improved. Thus, the light-emitting module emits the light having an improved luminance and the luminance uniformity. The power consumption of the display device having the light-emitting module is reduced and a display quality thereof is improved.

Also, the light-emitting unit is inserted into the groove being formed at the light guiding body, so that simplicity of assembling the light-emitting module and the display device is enhanced. Furthermore, since the thickness and the volume of the light-emitting module are reduced, the display device is thinner.

Having described exemplary embodiments of the present invention, it is noted that modifications and variations may be made by those having skill in the art in light without departing from the spirit and scope of the invention as defined by the appended claims.

What is claimed is:

1. A light-emitting module comprising:
   a light-guiding unit having a groove;
   a light-emitting unit disposed in a portion of the groove, wherein the light-emitting unit emits a first light; and
   a fluorescent unit formed in a remaining portion of the groove, wherein the fluorescent unit receives the first light and emits a second light having a different wavelength range than the first light,
   wherein the light-guiding unit comprises a first surface and a second surface, the first surface being an upper surface emitting the second light, the second surface being a lower surface opposite to the upper surface,
   wherein the groove is formed in a direction from the first surface to the second surface so that an opening of the groove is formed in the first surface.

2. The light-emitting module of claim 1, wherein the light-emitting unit includes a light-emitting diode for emitting a blue-colored light.

3. The light-emitting module of claim 2, wherein the fluorescent unit converts the blue-colored light into a white-colored light.

4. The light-emitting module of claim 3, wherein the fluorescent unit includes a yellow fluorescent unit.

5. The light-emitting module of claim 3, wherein the fluorescent unit includes a red fluorescent unit and a green fluorescent unit.

6. The light-emitting module of claim 1, further comprising a power printed circuit film electrically connected to the light-emitting unit and providing a driving current to the fluorescent unit.

7. The light-emitting module of claim 6, wherein the light-emitting unit is disposed on the power printed circuit film and is inserted into the groove.

8. The light-emitting module of claim 1, wherein the groove is defined by a base surface being formed at a determined depth from a surface of the light-guiding unit, and an inner side surface extending from the base surface.

9. The light-emitting module of claim 8, wherein the fluorescent unit having a predetermined thickness is formed on the base surface and the inner side surface.

10. The light-emitting module of claim 1, wherein the light-guiding unit further comprises:
    a side surface connecting the first surface to the second surface.

11. The light-emitting module of claim 10, wherein a plurality of the grooves is formed along an edge portion of the first surface.

12. The light-emitting module of claim 10, wherein the groove is formed in the side surface.

13. The light-emitting module of claim 12, further comprising a plurality of side surfaces, wherein a plurality of the grooves is formed in more than one of the side surfaces.

14. A method of manufacturing a light-emitting module comprising:
    forming a groove in a light-guiding body;
    forming a fluorescent unit in a portion of the groove; and inserting a light-emitting unit into a remaining portion of the groove, wherein the light-emitting unit is disposed on a power printed circuit film, wherein the light-guiding body comprises a first surface and a second surface, the first surface being an upper surface emitting light of the fluorescent unit, the second surface being a lower surface opposite to the upper surface, wherein the groove is formed in a direction from the first surface to the second surface so that an opening of the groove is formed in the first surface.

15. The method of manufacturing a light-emitting module of claim 14, wherein:

the light-emitting unit includes a blue-colored light-emitting diode for emitting a blue-colored light, and the fluorescent unit includes a fluorescent material for converting the blue-colored light into a white-colored light and emitting the white-colored light toward a surface of the groove.

* * * * *